(12) United States Patent
Shamasundar

(10) Patent No.: US 12,197,715 B2
(45) Date of Patent: Jan. 14, 2025

(54) METHODS AND SYSTEMS FOR AUTOMATED CONTEXTUAL NAVIGATION OF GUI DISPLAYS

(71) Applicant: HONEYWELL INTERNATIONAL INC., Charlotte, NC (US)

(72) Inventor: Raghu Shamasundar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/333,069

(22) Filed: Jun. 12, 2023

(65) Prior Publication Data

US 2024/0361894 A1   Oct. 31, 2024

(30) Foreign Application Priority Data

Apr. 28, 2023 (IN) .............................. 202311030542

(51) Int. Cl.
| | |
|---|---|
| *G06F 3/048* | (2013.01) |
| *B64D 43/00* | (2006.01) |
| *G06F 3/04847* | (2022.01) |
| *G06F 3/01* | (2006.01) |

(52) U.S. Cl.
CPC ......... *G06F 3/04847* (2013.01); *B64D 43/00* (2013.01)

(58) Field of Classification Search
CPC ............................. G06F 3/04847; B64D 43/00
See application file for complete search history.

(56) References Cited

U.S. PATENT DOCUMENTS

| | | | | |
|---|---|---|---|---|
| 6,199,008 B1* | 3/2001 | Aratow | ................. | G06T 11/206 701/14 |
| 6,236,913 B1* | 5/2001 | Bomans | ............... | G08G 5/0021 244/221 |
| 6,828,922 B1* | 12/2004 | Gremmert | ............... | G01S 7/003 342/26 B |
| 6,917,860 B1* | 7/2005 | Robinson | ............. | G08G 5/0034 340/963 |

(Continued)

FOREIGN PATENT DOCUMENTS

KR    20160134334 A    11/2016

OTHER PUBLICATIONS

Goel, Mayank, et al., "WalkType: Using Accelerometer Data to Accommodate Situational Impairments in Mobile Touch Screen Text Entry," CHI 2012, May 5-10, 2012, Austin, Texas, USA.

(Continued)

*Primary Examiner* — Nicholas Augustine
(74) *Attorney, Agent, or Firm* — Lorenz & Kopf LLP

(57) ABSTRACT

Vehicle systems and methods are provided for assisting operation of a vehicle by automatically updating a secondary display in response to a user input on a primary display. One method involves determining a context associated with the user input on a first graphical user interface (GUI) display based at least in part on current status information associated with the vehicle and a location of the user input on the first GUI display, determining a destination GUI display for receiving a second user input corresponding to the location of the user input on the first GUI display based at least in part on the context, and automatically updating a second GUI display distinct from the first GUI display to the destination GUI display responsive to the user input.

19 Claims, 8 Drawing Sheets

(56) References Cited

U.S. PATENT DOCUMENTS

| | | | |
|---|---|---|---|
| 7,312,725 B2* | 12/2007 | Berson | G02B 27/01 |
| | | | 345/9 |
| 7,467,031 B2* | 12/2008 | King | G01C 23/005 |
| | | | 701/4 |
| 8,046,165 B2* | 10/2011 | Sacle | G08G 5/0013 |
| | | | 701/16 |
| 8,159,464 B1 | 4/2012 | Gribble et al. | |
| 9,611,055 B2 | 4/2017 | Subramanyam et al. | |
| 9,714,081 B1* | 7/2017 | Hall, III | B64D 47/00 |
| 10,275,427 B2 | 4/2019 | Saptharishi et al. | |
| 10,501,093 B2 | 12/2019 | Park | |
| 11,498,697 B2 | 11/2022 | Tellechea et al. | |
| 2008/0109160 A1* | 5/2008 | Sacle | G08G 5/0013 |
| | | | 701/33.4 |
| 2008/0231634 A1 | 9/2008 | Gyde et al. | |
| 2009/0112464 A1* | 4/2009 | Belcher | G08G 5/0052 |
| | | | 701/414 |
| 2010/0131186 A1* | 5/2010 | Geelen | G01C 21/26 |
| | | | 715/835 |
| 2011/0006983 A1 | 1/2011 | Grothe | |
| 2011/0118908 A1* | 5/2011 | Boorman | G08G 5/0021 |
| | | | 701/14 |
| 2013/0293452 A1* | 11/2013 | Ricci | G06F 3/04847 |
| | | | 345/156 |
| 2016/0161283 A1 | 6/2016 | Shamasundar et al. | |
| 2016/0179327 A1* | 6/2016 | Zammit-Mangion | |
| | | | G06F 3/0482 |
| | | | 701/3 |
| 2017/0358219 A1* | 12/2017 | Garai | G08G 5/0047 |
| 2019/0113403 A1* | 4/2019 | Adams | B64C 27/08 |
| 2020/0088542 A1* | 3/2020 | Feyereisen | B64D 43/02 |
| 2020/0105145 A1* | 4/2020 | Feyereisen | B64D 43/02 |
| 2020/0340827 A1* | 10/2020 | Gepner | G01C 23/005 |
| 2021/0103367 A1 | 4/2021 | Havins | |
| 2021/0333806 A1 | 10/2021 | Urbanec et al. | |
| 2022/0244898 A1 | 8/2022 | He et al. | |

OTHER PUBLICATIONS

Screen captures at 1:44 and 1:46 from YouTube video clip entitled "Intro TouchScreenOnProLineFusion#3" Uploaded in 2015 by user "Rockwell Collins". Retrieved from Internet: <https://www.youtube.com/watch?v=5sV0133wgw4> on Jun. 12, 2023.

* cited by examiner

METHODS AND SYSTEMS FOR AUTOMATED CONTEXTUAL NAVIGATION OF GUI DISPLAYS

CROSS REFERENCE TO RELATED APPLICATION

This application claims priority to India Provisional Patent Application No. 202311030542, filed Apr. 28, 2023, the entire content of which is incorporated by reference herein.

TECHNICAL FIELD

The subject matter described herein relates generally to vehicle systems, and more particularly, embodiments of the subject matter relate to aircraft systems and related cockpit displays.

BACKGROUND

Modern electronic displays for vehicles (such as aircraft, automobiles, marine vessels, or trains) display a considerable amount of information, such as vehicle position, navigation and terrain information. In the case of an aircraft, many modern flight deck displays (or cockpit displays) are utilized to provide a number of different displays from which the user can obtain information or perform functions related to, for example, navigation, flight planning, guidance and navigation, and performance management. Modern aircraft often include one or more displays arranged or placed directly in front of a pilot or co-pilot, alternatively referred to as forward displays since they are viewable in the forward line-of-sight, along with separate displays arranged or placed adjacent to or in between a pilot and co-pilot, which may alternatively be referred to as head down displays. Workload devoted to navigating pages or menus on a head down display detracts from focus that could otherwise be directed forward or focused on primary operation of the aircraft. Accordingly, it is desirable to improve the ease of interaction with GUI displays to reduce pilot workload and head down time, and thereby improve situational awareness with respect to forward operation. Other desirable features and characteristics will become apparent from the subsequent detailed description and the appended claims, taken in conjunction with the accompanying drawings and this background.

BRIEF SUMMARY

Vehicle systems and methods are provided for contextual updating of different vehicle displays responsive to a user input on another vehicle display. One exemplary method of assisting operation of a vehicle involves determining an operational context associated with a user input on a first graphical user interface (GUI) display based at least in part on current status information associated with the vehicle and a location of the user input on the first GUI display, determining a destination GUI display for receiving a second user input corresponding to the location of the user input on the first GUI display based at least in part on the operational context and automatically updating a second GUI display distinct from the first GUI display to the destination GUI display responsive to the user input. The destination GUI display is distinct from the first GUI display.

An apparatus for a computer-readable medium is also provided. The computer-readable medium has computer-executable instructions stored thereon that, when executed by a processing system, are configurable to cause the processing system to determine an operational context associated with a user input on a first graphical user interface (GUI) display based at least in part on current status information associated with a vehicle and a location of the user input on the first GUI display, determine a destination GUI display for receiving a second user input corresponding to the location of the user input on the first GUI display based at least in part on the operational context, and automatically update a second GUI display distinct from the first GUI display to the destination GUI display responsive to the user input, wherein the destination GUI display is distinct from the first GUI display.

A vehicle system is also provided that includes a primary display device, a first system coupled to the primary display device to provide a first graphical user interface (GUI) display on the primary display device, a secondary display device distinct from the primary display device, a second system coupled to the secondary display device to provide a second GUI display on the secondary display device, and a processing system coupled to the first system and the second system. The processing system is capable of providing a secondary display updating service configurable to receive indication of a selection context associated with a location of a user input on the first GUI display from the first system, determine a target operational context for the user input based at least in part on the selection context and current status information associated with a vehicle, determine a destination GUI display for receiving a second user input corresponding to the target operational context, and automatically command the second system to update the secondary display device to display the destination GUI display in lieu of the second GUI display responsive to the user input on the first GUI display.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF DRAWINGS

Exemplary embodiments of the subject matter of the present disclosure will hereinafter be described in conjunction with the following drawing figures, wherein like numerals denote like elements, and wherein.

DETAILED DESCRIPTION

Figure 1:
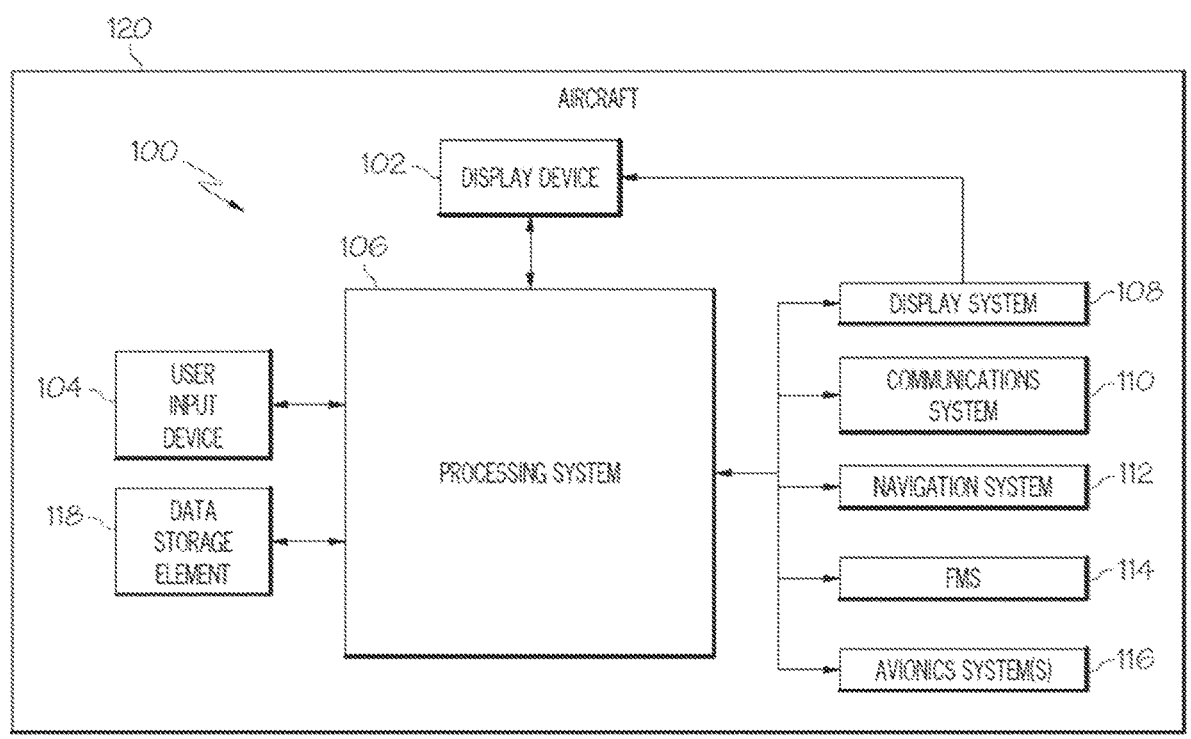
FIG. 1 is a block diagram of a system for an aircraft in accordance with one or more exemplary embodiments.

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to systems and methods for automated navigation and pagination of graphical user interface (GUI) displays in an intelligent and context-sensitive manner to reduce workload and head down time. For purposes of explanation, the subject matter is described herein primarily in the context of a flight deck display, an electronic flight bag (EFB) or other cockpit display onboard an aircraft in an aviation context. However, it should be understood that the subject matter described herein is not necessarily limited to use with aircraft or other vehicle systems or applications and may be similarly utilized in other application, systems or environments, including, but not limited to use with other types of vehicles (e.g., automobiles, marine vessels, trains, etc.).

In exemplary embodiments described herein, user inputs provided with respect to a forward-looking display, a head-up display or another forward display are analyzed to automatically paginate and navigate another secondary or auxiliary display based on the selection context associated with the user input (e.g., what a pilot selected) and the current operational context associated with the aircraft (e.g., when the pilot made the selection), such that the secondary display is automatically updated to a corresponding GUI display for receiving a subsequent user input corresponding to the user input received on the forward display. For example, the location of a tactile user input or other selection on a primary flight display (PFD) GUI display depicted on a forward display device may be analyzed to determine a corresponding selection context associated with the user input based on the location of the user input on the PFD GUI display. Based on the current aircraft status or other information indicative of a current operational context for the aircraft, a corresponding target operational context for the user input is determined based on the selection context and the current operational context, that is, what the pilot is attempting to do on a secondary display based on what the pilot selected on a primary display and when the pilot made the selection on the primary display. In this regard, the target operational context is indicative of the parameter, variable, setting, configuration or other action that the user is most likely to be interested in configuring, modifying, reviewing or otherwise interacting with given the selection context and the current operational context.

Based on the target operational context corresponding to the received user input, the appropriate destination GUI display for interacting with that parameter, variable, or other action on the Multi-Function Control and Display Unit (MCDU), Multi-Function Display (MFD) or other flight management system (FMS) display is identified and then utilized to automatically update the MCDU or other FMS display in response to the selection on the PFD GUI display without requiring the user to manually navigate and paginate the menus, pages or other sequences of GUI displays and corresponding selections needed to arrive at that destination GUI display. In this manner, head down time and workload is reduced by allowing a touch or other tactile user input on the PFD GUI display on a forward display device to automatically paginate and update the GUI display presented at the MCDU or other head down display device. It should be noted that the subject matter described herein is not limited to updating the GUI display depicted by an MCDU or other FMS display device in response to user inputs on a PFD display, and the subject matter may be implemented in an equivalent manner in the context of automatically updating any sort of secondary or auxiliary head down display in response to any sort of user input on any sort of primary or forward display. That said, for purposes of explanation, the subject matter may be primarily described herein in the context of automatically updating GUI displays at an MCDU or other FMS display device in response to touch selections or other tactile user inputs on or otherwise with respect to a PFD GUI display on forward display device.

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, an airport database, a terminal airspace database, a special use airspace database, or other information for rendering and/or displaying navigational maps and/or other content on the display device 102.

In the illustrated embodiment, the aircraft system 100 includes a data storage element 118, which is capable of storing, maintaining or otherwise implementing one or more of the databases that support operations of the aircraft system 100 described herein. In some embodiments, the data storage element 118 contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information includes instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VOR-TACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and case of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
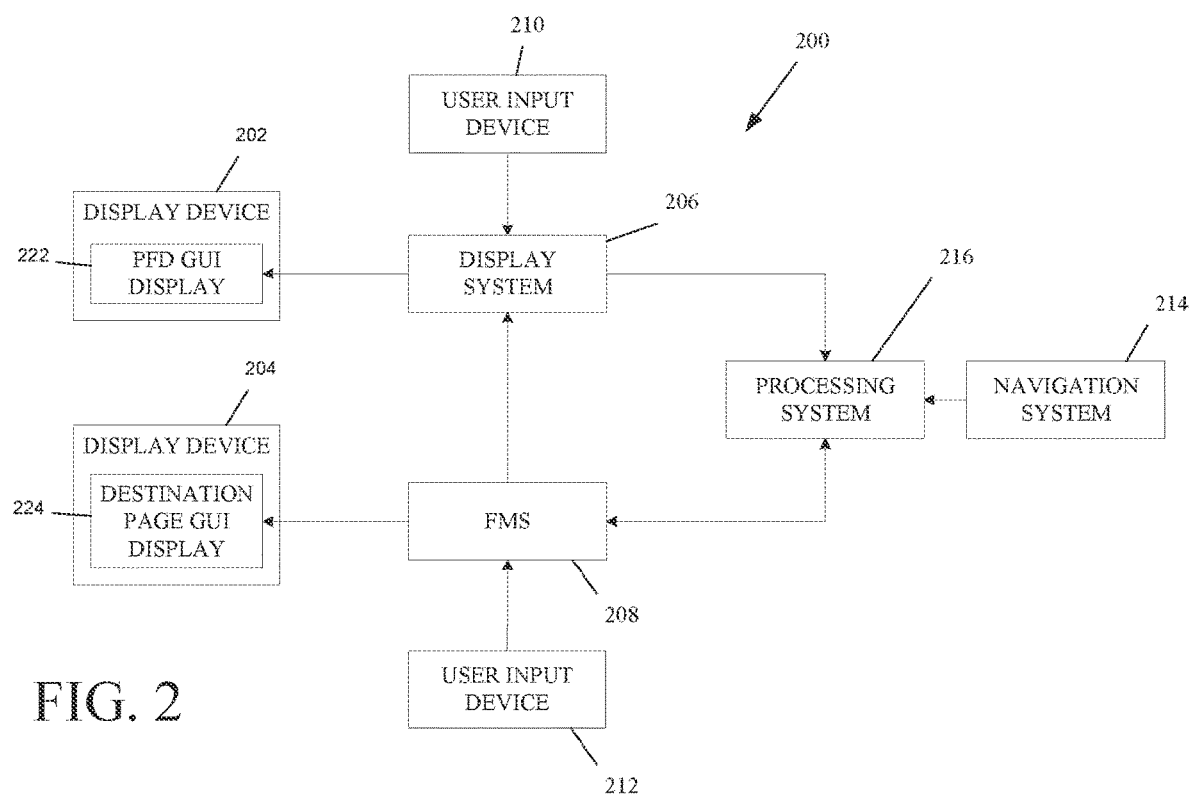
FIG. 2 depicts an exemplary system suitable for use with the aircraft system of FIG. 1 in one or more exemplary embodiments.

FIG. 2 depicts an exemplary embodiment of system 200 suitable for use with a vehicle system (e.g., aircraft system 100 of FIG. 1) to automatically update a GUI display depicted on a secondary display device 204 in response to a user input received with respect to a different GUI display depicted on a different primary display device 202. For purposes of explanation, the system 200 is described herein in the context of an aircraft where the primary display device 202 (e.g., an instance of display device 102) is realized as a forward display device that depicts a PFD GUI display 222 or other forward-looking GUI display under control of a display system 206 (e.g., display system 108) and the secondary display device 204 (e.g., a second instance of display device 102) is realized as a head down display device integrated with an instrument panel in the cockpit that is capable of depicting different GUI displays 224 under control of a FMS 208 (e.g., FMS 114). That said, it should be appreciated that the subject matter described herein is not limited to any particular type of content presented on the display devices 202, 204 or any particular physical arrangement or configuration of the display devices 202, 204. Various elements in the system 200 of FIG. 2 are similar to counterpart elements described above in the context of FIG. 1 and will not be redundantly described in detail in the context of FIG. 2.

The forward display device 202 is coupled to the display system 206, which is configured to render, generate or otherwise provide a PFD GUI display 222 on the display device 202. In general, a PFD GUI display 222 is capable of being utilized by a pilot or other user for guidance with respect to manually flying the aircraft, that is, the pilot's primary reference for flight information (e.g., speed and altitude indicia, attitude indicia, lateral and vertical deviation indicia, mode annunciations, and the like), which may be continuously refreshed during operation as the aircraft travels to reflect changes in the attitude, altitude and/or position of the aircraft with respect to the earth. In this regard, the PFD GUI display 222 typically includes one or more graphical attitude indicia that convey the current attitude of the aircraft, along with various features that may be graphically rendered, including, without limitation a perspective view of terrain that corresponds to the forward-looking cockpit viewpoint from the aircraft, a reference symbol (or ownship symbol) corresponding to the current flight path of the aircraft, an airspeed indicator (or airspeed tape) that indicates the current airspeed of the aircraft, an altitude indicator (or altimeter tape) that indicates the current altitude of the aircraft, along with pitch and roll indicia. The various details of the PFD GUI display 222 may vary depending on the particular implementation and any number of other factors and are not germane to this disclosure. As shown, the display system 206 may be coupled to the FMS 208 to receive information pertaining to the flight plan, the current state of the aircraft, and the like, which, in turn may be utilized by the display system 206 to render a PFD GUI display 222 that accurately reflects the current state of the aircraft and the flight plan currently being flown.

The display system 206 is coupled to a user input device 210 (e.g., an instance of user input device 104) to receive or otherwise obtain user input with respect to the PFD GUI display 222 rendered on the forward display device 202. In this regard, although FIG. 2 depicts the user input device 210 as being separate from the forward display device 202, in practice, the user input device 210 may be integrated or otherwise combined with the display device 202. For example, in some implementations, the user input device 210 is realized as a touch panel or other device or component capable of receiving tactile user input that is integrated with the forward display device 202 to provide a touchscreen display capable of responding to touch or other tactile user input.

Still referring to FIG. 2, in exemplary implementations, the secondary display device 204 is separate and distinct from the forward display device 202. For example, the secondary display device 204 may be realized as an MCDU or MFD that is integrated with the instrument panel in the cockpit flight deck or adjacent to the pilot seat (e.g., between the pilot and co-pilot). In this regard, when realized as an MCDU or MFD, one or more user input devices 212 (e.g., keys, buttons and/or the like) may be integrated or otherwise combined with the display device 204 in a common housing to provide the MCDU or MFD. The user input device 212 is coupled to the FMS 208 to enable a pilot, co-pilot or other user to provide user input associated with the current FMS page GUI display 224 depicted on the secondary display device 204, for example, to view, select, modify, configure or update a value for a parameter, variable or other setting associated with a flight plan maintained at the FMS 208. In this regard, the FMS 208 may be configurable to display any number of different menus, pages or other GUI displays 224 on the display device 204 that allow a pilot to make different sequences or series of menu selections to drill down and analyze various different aspects of the flight plan or other aspects of the current aircraft operation.

In exemplary embodiments, the display system 206 and the FMS 208 are coupled to a processing system 216 (e.g., processing system 106) that executes code or other executable programming instructions to generate, support or otherwise provide a display updating service that commands or otherwise instructs the FMS 208 to automatically and dynamically update the FMS page GUI display 224 depicted on the secondary display device 204 in response to a received user input on the PFD GUI display 222 as described in greater detail below. In a similar manner as described above in the context of FIG. 1, the processing system 216 is coupled to a navigation system 214 (e.g., navigation system 112) to receive data or other information indicative of the current state of the aircraft, including, but not limited to, the current aircraft location, the current aircraft altitude, the current aircraft heading, the current aircraft speed, the current aircraft orientation (e.g., pitch, roll and yaw), and/or the like. Additionally, the processing system 216 may receive other data or other information indicative of the current state of the aircraft from the FMS 208 or other avionics systems onboard the aircraft, including, but not limited to, the current flight phase, the current aircraft procedure, the current aircraft configuration, and/or the like.

When a selection or other user input is received via the PFD GUI display 222, the display system 206 provides, to the display updating service at the processing system 216, information identifying the displayed content, selected GUI element, or other context corresponding to the location of the user input on the PFD GUI display 222, which may alternatively be referred to herein as the selection context corresponding to the location of the user input on the PFD GUI display 222. For example, when the user input location aligns with or otherwise corresponds to the altitude indicator (or altimeter tape) or another selectable GUI element associated with the altitude operational parameter, the display system 206 may provide indication of the altitude as the aircraft parameter or variable associated with the received user input along with indication of the altitude value displayed at or near the location of the user input. Based on the selection context received from the display system 206 and the current operational context associated with the aircraft identified based on the current aircraft state information from the navigation system 214 and/or the FMS 208, the display updating service at the processing system 216 identifies or otherwise determines a target operational context associated with the user input. In this regard, the target operational context represents the parameter, variable, or other action that the pilot or other user is most likely to be interested in configuring, modifying, reviewing or otherwise interacting with given the selection context and the current operational context, that is, the parameter, variable, or other action that the pilot or other user was attempting to view or configure by making the user input on the PFD GUI display 222.

Based on the target operational context, the display updating service identifies or otherwise determines the corresponding destination FMS page GUI display 224 for viewing or interacting with that particular parameter, variable, or action and provides a corresponding page revision command or instruction to the FMS 208 to update the secondary display device 204 to depict the destination FMS page GUI display 224 in lieu of the current (or preceding) GUI display.

In this manner, the display updating service automatically and dynamically updates the FMS page GUI display 224 on the head down display device 204 in response to a user input on the PFD GUI display 222 on the forward display device 202 without requiring user interaction with the secondary display device 204 and/or the FMS 208 via the user input device 212. Once the destination FMS page GUI display 224 is presented on the secondary display device 204, the pilot or other user may manipulate the user input device 212 to interact with the FMS 208 via the destination FMS page GUI display 224 to configure, modify or otherwise review the particular parameter, variable, setting, configuration or other action of interest. Thus, by automatically navigating and paginating GUI displays associated with the FMS 208 to arrive at the desired destination FMS page GUI display 224, the pilot's head down time and workload is reduced when interacting with the FMS 208 via the head down display device 204.

Figure 3:
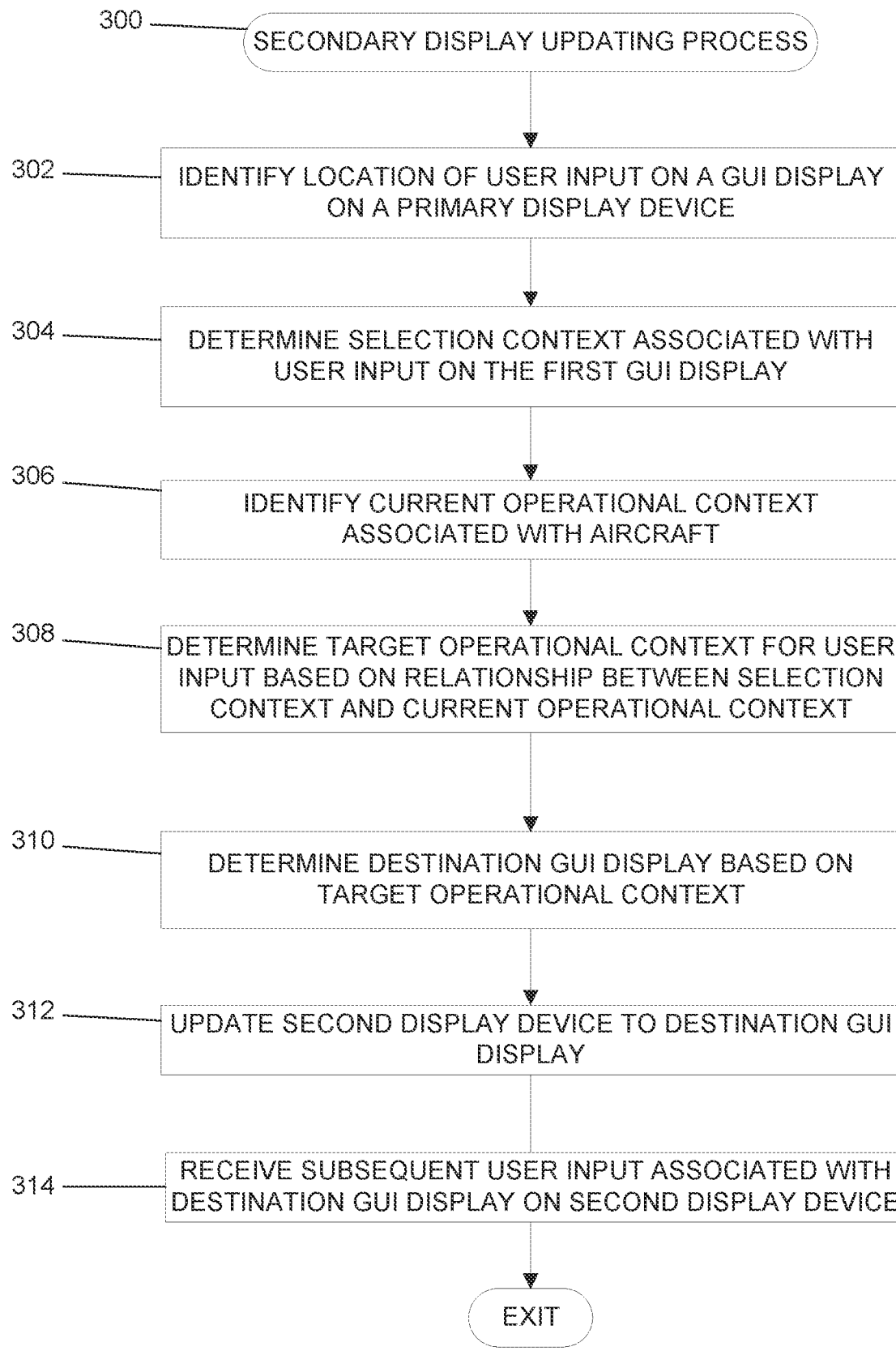
FIG. 3 is a flow diagram of a secondary display updating process suitable for implementation in connection with an aircraft system or another vehicle system in an exemplary embodiment.

FIG. 3 depicts an exemplary embodiment of a secondary display updating process 300 suitable for implementation in a vehicle system to automatically navigate and paginate through a sequence of GUI displays on a head down display device in a context-sensitive manner to reduce workload and head down time. The various tasks performed in connection with the illustrated process may be implemented using hardware, firmware, software executed by processing circuitry, or any combination thereof. For illustrative purposes, the following description may refer to elements mentioned above in connection with FIGS. 1-2. In practice, portions of the secondary display updating process 300 may be performed by different elements of a vehicle system. That said, exemplary embodiments are described herein in the context of the secondary display updating process 300 being primarily performed by a display updating service at a processing system 106, 216 coupled to other onboard systems 108, 110, 112, 114, 116, 206, 208 responsible for rendering different GUI displays on different instances of display devices 102, 202, 204 onboard an aircraft. It should be appreciated that the secondary display updating process 300 may include any number of additional or alternative tasks, the tasks need not be performed in the illustrated order and/or the tasks may be performed concurrently, and/or the secondary display updating process 300 may be incorporated into a more comprehensive procedure or process having additional functionality not described in detail herein. Moreover, one or more of the tasks shown and described in the context of FIG. 3 could be omitted from a practical embodiment of the secondary display updating process 300 as long as the intended overall functionality remains intact.

Referring to FIG. 3 with continued reference to FIGS. 1-2, the secondary display updating process 300 is initiated or otherwise performed in response to receiving a user input on a forward or primary display device. The secondary display updating process 300 identifies or otherwise obtains information indicating the location of a received user input on a GUI display presented on a primary display device and then determines a corresponding selection context associated with the received user input on the GUI display based on the location of the user input and the underlying content on the GUI display (tasks 302, 304). In this regard, the secondary display updating process 300 maps the location of the user input on a PFD GUI display 222 or other forward display on a forward or primary display device 202 to a corresponding parameter, variable, setting, configuration or other action that the pilot or other user is attempting to interact with.

For example, a touch panel, touchscreen or similar tactile user input device 210 associated with a forward display device 202 may output or otherwise provide, to the display system 206, indication of a coordinate location corresponding to a touch or other tactile user input received via the tactile user input device 210. Based on the coordinate location of the received tactile user input, the display system 206 may identify a coordinate location on the display device 202 that collocates with, encompasses, underlies or otherwise corresponds to the location of the received tactile user input, and based thereon, identify the corresponding operational parameter, GUI element, flight data, information or other content displayed at that corresponding location or region on the forward display device 202 that is being interacted with by received tactile user input. The display system 206 and/or the secondary display updating process 300 may also account for the relative spatial relationship between the coordinate location of the received tactile user input and other content displayed on the PFD GUI display 222 on the forward display device 202. For example, if the tactile user input is provided on the altitude indicator (or altimeter tape) above an indicator of the current aircraft altitude, the display system 206 may determine that the received tactile user input corresponds to an altitude above the current aircraft altitude. The display system 206 may then transmit or otherwise provide, to the display updating service at the processing system 216, indication of the coordinate location and selection context associated with the received user input (e.g., the current state or identification of the PFD GUI display 222 currently being presented, the depicted flight data, information or other parameter, variable, setting, configuration or the like that was selected, and/or the like).

Still referring to FIG. 3, the secondary display updating process 300 identifies the current operational context associated with the aircraft and then determines a target operational context on a secondary display device for the received user input on the primary display device based at least in part on the relationship between the selection context for the received user input and the current operational context for the aircraft (tasks 306, 308). In this regard, the target operational context corresponds to the particular parameter, variable, setting, configuration or other action that the pilot or other user is most likely to be interested in interacting with on a head down or secondary display device by selecting or otherwise indicating the particular displayed content on the forward or primary display device given the current aircraft operational context. In other words, the display updating service at the processing system 106, 216 attempts to identify the particular modification or interaction that the pilot is attempting, with respect to a particular parameter, variable, setting, configuration or other action that is most probable or logical given the current operational context of the aircraft.

In exemplary embodiments, the display updating service at the processing system 106, 216 obtains current status information associated with the aircraft from one or more onboard systems 110, 112, 114, 116, 208, 214 and utilizes the obtained information to identify or otherwise determine the current operational context that defines the current operating state of the aircraft, such as, for example, one or more of the current aircraft location, the current aircraft speed, the current flight phase, the current aircraft procedure being flown, the current flight plan (or the current waypoint within the flight plan), the current airspace or geographic region of operation, the current aircraft configuration, and/or the like. Based on the current operational context for the aircraft and the current selection context associated with the received user input, the display updating service at the processing system 106, 216 identifies or otherwise determines the parameter, variable, setting, configuration or the like that is most likely to be of interest to the pilot or other user given the current selection context and the current aircraft operational context. In this manner, the display updating service maps a particular combination of user input selection context and aircraft operational context to a particular parameter, variable, setting, configuration or the like. Thus, depending on the current aircraft flight phase, current aircraft procedure, current aircraft altitude and/or other aircraft state information in concert with the displayed content that was selected, the display updating service may identify a different parameter, variable, setting or configuration for interaction given the current aircraft operational context.

In some implementations, the display updating service at the processing system 106, 216 may utilize a multidimensional lookup table that is configured to map a particular combination of current aircraft state variables and current selection context to a particular parameter, variable, setting or configuration for interaction. That said, in other implementations, the display updating service at the processing system 106, 216 may utilize one or more logic rules to identify the parameter, variable, setting or configuration for interaction. In yet other implementations, the display updating service may utilize a model derived using machine learning or artificial intelligence techniques to probabilistically determine the target operational context given the particular combination of current selection context and current aircraft operational context variables input to the model.

Still referring to FIG. 3, after identifying the target operational context corresponding to the received user input on the primary display device, the secondary display updating process 300 identifies or otherwise determines the appropriate destination GUI display for the secondary display device based on the target operational context and then automatically updates the secondary display device to the destination GUI display (tasks 310, 312). In exemplary implementations, the display updating service at the processing system 106, 216 determines what destination FMS page GUI display 224 should be presented to enable the pilot or other user to interact with the particular parameter, variable, setting, configuration or other action corresponding to the target operational context, and then provides a corresponding command or instruction to the FMS 208 to automatically update the secondary display device 204 to present that destination FMS page GUI display 224 in lieu of a previously presented FMS page GUI display 224. For example, in practice, there may be as many as 60 or more different FMS page GUI displays, with different layouts and sequences that may vary depending on any number of factors. Rather than requiring a pilot to mentally memorize and manually navigate through a sequence of FMS page GUI displays to arrive at the appropriate destination FMS page GUI display 224 for the target operational context, the display updating service at the processing system 106, 216 automatically commands the FMS 208 to provide the destination FMS page GUI display 224 on the secondary display device 204, thereby reducing the pilot workload and head down time.

In one or more implementations, the display updating service at the processing system 106, 216 maintains a table or database of the different potential FMS page GUI displays supported by the FMS 208 along with information identifying the parameters, variables, settings, configurations, actions and/or the like that are associated with a respective FMS page GUI display and potentially other information qualifying or characterizing the respective FMS page GUI display (e.g., the intent or purpose of the respective FMS page GUI display). Based on the target operational context for the received user input, the display updating service at the processing system 106, 216 may analyze the listing of the different potential FMS page GUI displays to identify the best fit or closest match to the target operational context as the appropriate destination FMS page GUI display 224 to be depicted on the secondary display device 204 responsive to the user input on the primary display device 202.

After updating the secondary display device to the appropriate destination GUI display, the illustrated secondary display updating process 300 continues by receiving or otherwise obtaining subsequent user input(s) associated with the destination GUI display on the secondary display device (task 314). In this regard, after the head down display device 204 is automatically updated to depict the destination FMS page GUI display 224 corresponding to the target operational context for the tactile user input received on the PFD GUI display 222, the pilot may manipulate the user input device 212 associated with the head down display device 204 to modify, configure or otherwise interact with the particular parameter, variable, setting or configuration that the pilot was attempting to interact with via the PFD GUI display 222, and thereby modify or update the values for that particular parameter, variable, setting or configuration at the FMS 208 (or another onboard avionics system via the FMS 208). In this manner, the pilot can expeditiously interact with and update values at the FMS 208 via an initial user input on the PFD GUI display 222 without having to manually navigate through the various different menus, pages or other GUI display sequences that may be required to arrive at the appropriate destination FMS page GUI display 224 from the initial FMS page GUI display that was currently presented at the time of the user input on the PFD GUI display 222. Additionally, any modifications or changes to values made at the FMS 208 may be propagated back to the display system 206 to dynamically update the PFD GUI display 222 to reflect the changes at the FMS 208 as appropriate substantially in real-time. For example, updating the value at the FMS 208 for a targeted cruise altitude or other constraint depicted on the PFD GUI display 222 may result in the PFD GUI display 222 being updated substantially in real-time in response to the change at the FMS 208. Thus, the user input on the PFD GUI display 222 may be utilized to automatically navigate and paginate through the page GUI displays associated with the FMS 208 to allow the pilot to expeditiously change a value of an operational parameter at the FMS 208, and thereby change the value of the operational parameter depicted on the PFD GUI display 222.

Figure 4:
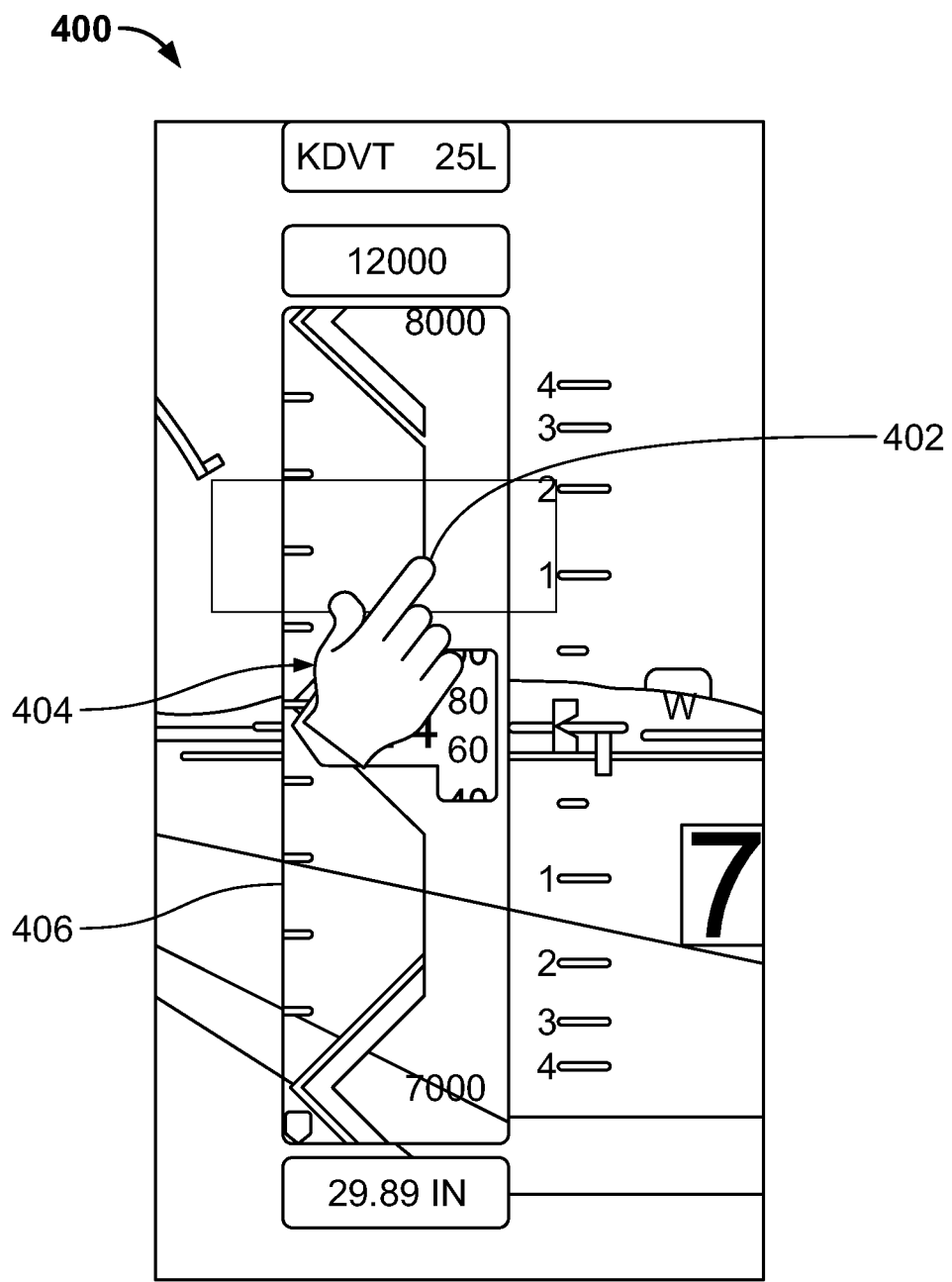
FIGS. 4-8 depict exemplary graphical user interface (GUI) displays suitable for presentation in an aircraft system in connection with one or more exemplary implementations of the secondary display updating process of FIG. 3.
Figure 5:
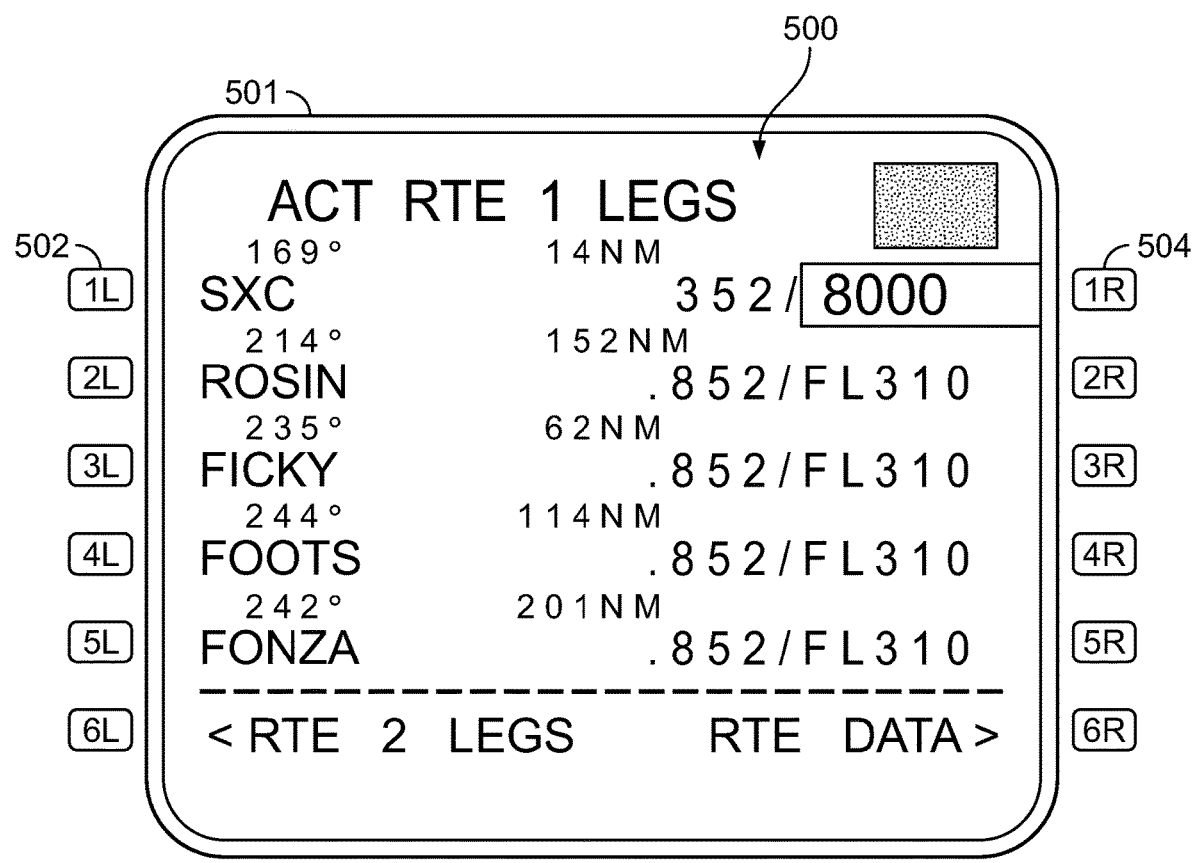

FIGS. 4-5 depict an exemplary sequence of a PFD GUI display 400 that may be presented on a forward display device (e.g., primary display device 202) and a corresponding destination FMS page GUI display 500 that may be presented on a head down display device (e.g., secondary display device 204) in connection with one or more exemplary implementations of the secondary display updating process 300. In this regard, FIG. 5 depicts an MCDU that includes a display device 501 (e.g., display device 204) that is integrated with line select keys 502, 504 or similar user input devices (e.g., input device 212) in a common housing.

FIG. 4 depicts a portion of a PFD GUI display 400 where the location 402 of a received tactile user input 404 overlies an altitude indicator 406 (or altimeter tape). In response to receiving the coordinate location pilot's touch input via the tactile user input device 210, the display system 206 identifies the corresponding coordinate location on the PFD GUI display 222, 400 as corresponding to an altitude level of 7500 feet on the altimeter tape 406 and provides corresponding indication of that selection context to the display updating service at the processing system 216 (e.g., altitude 7500). Based on the current flight phase for the aircraft (e.g., climb) and the current altitude of the aircraft being less than the cruise altitude of 12,000 feet (e.g., the current aircraft operational context), the display updating service determines the target operational context for the received input 404 as viewing, modifying or otherwise defining an altitude constraint that is at or above the selected altitude value of 7500 feet.

Given the target operational context (e.g., altitude constraint of 7500 feet), the display updating service at the processing system 216 analyzes the current flight plan for the aircraft obtained from the FMS 208 to identify an upcoming waypoint of the flight plan having an altitude constraint between the current aircraft altitude and the target cruise altitude as the desired parameter to be interacted with, and then identifies the corresponding FMS page GUI display for interacting with that upcoming waypoint as the destination FMS page GUI display 224 to be presented on the secondary display device 204. In this regard, FIG. 5 depicts the resulting destination FMS Active Legs page GUI display 500 for defining altitude constraints for the leg of the flight plan route ("ACT RTE 1 LEGS") to be presented on the MCDU or other head down display device 204 that includes a listing of the upcoming waypoints of the current flight plan that includes an upcoming waypoint (e.g., SXC waypoint) having an associated altitude constraint closest to the selected altitude value on the PFD GUI display 400 (e.g., 8000 feet). In this regard, the display updating service may command the FMS 208 so that the waypoints of the current flight plan are automatically paginated or scrolled such that the destination FMS page GUI display 500 depicts the targeted upcoming waypoint of the current flight plan having an associated altitude constraint closest to the selected altitude value at the top of the listing within the destination FMS page GUI display 500. Thus, the pilot does not need to manually scroll or paginate the depicted FMS page GUI display (e.g., by sequentially advancing through waypoints of the flight plan) and can expeditiously interact with the targeted upcoming waypoint to modify or define an updated altitude constraint via the associated line select keys 502, 504 of the MCDU, thereby reducing head down time for modifying an altitude constraint in response to selection of the altimeter tape 406 on the PFD GUI display 400.

Figure 6:
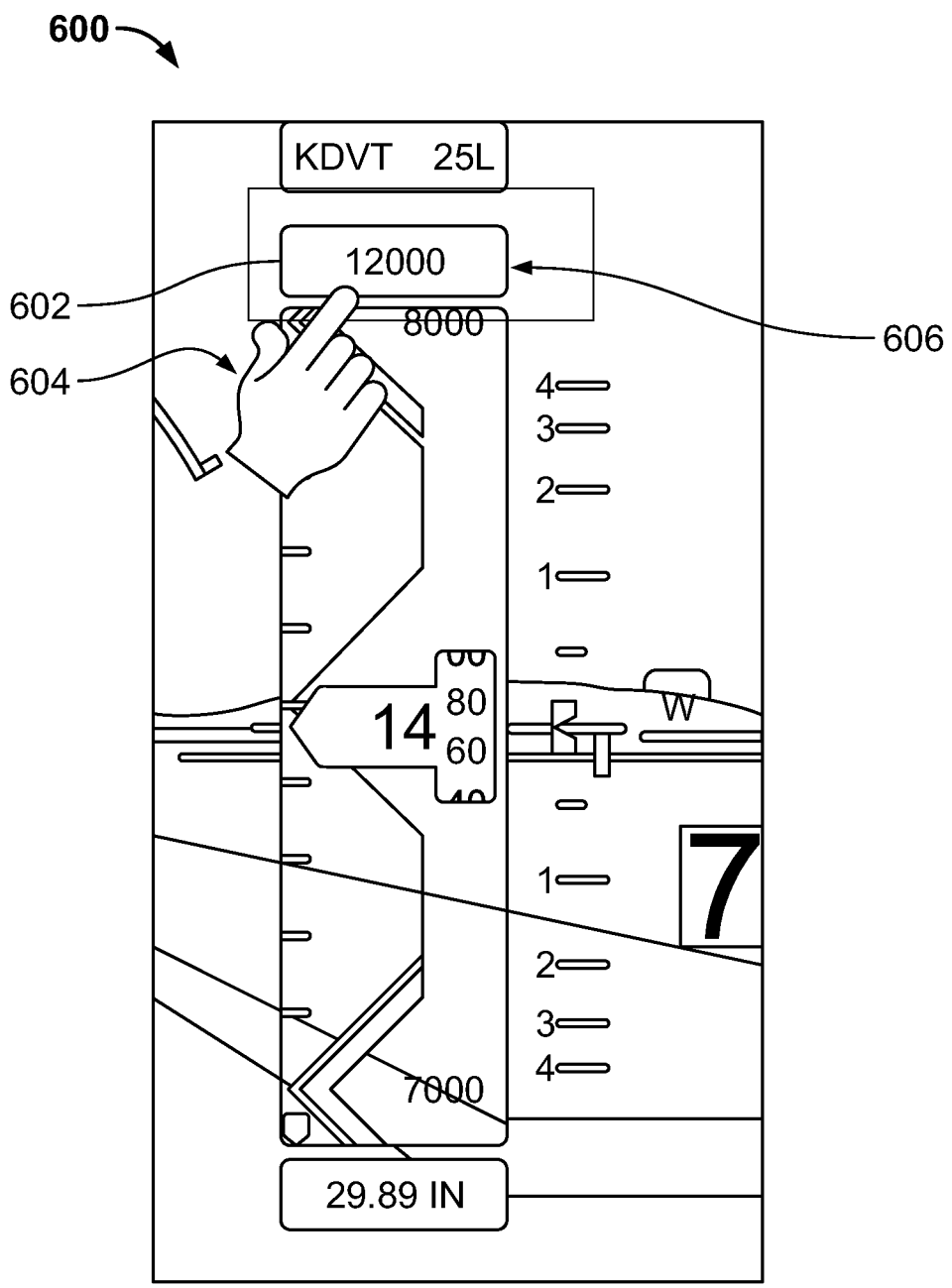
Figure 7:
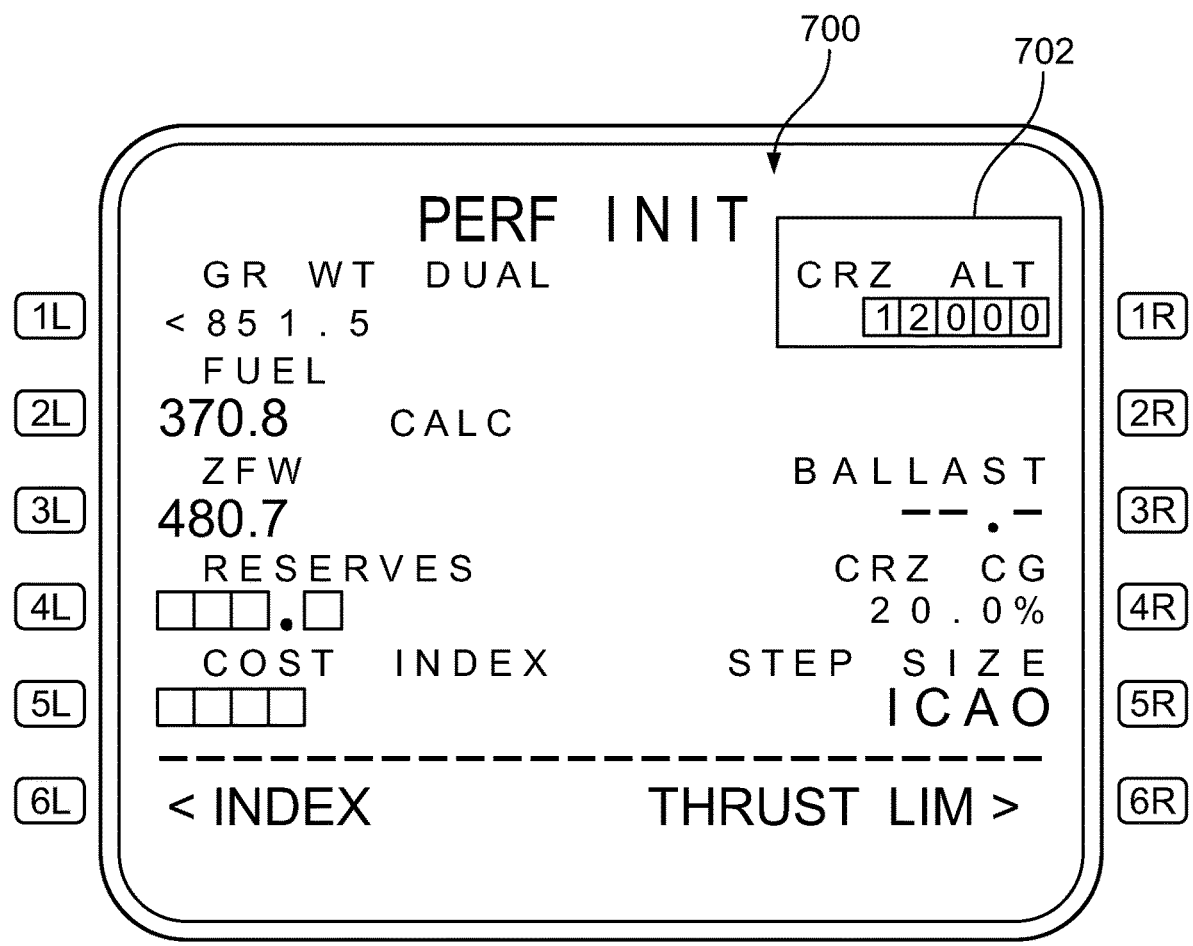
Figure 8:
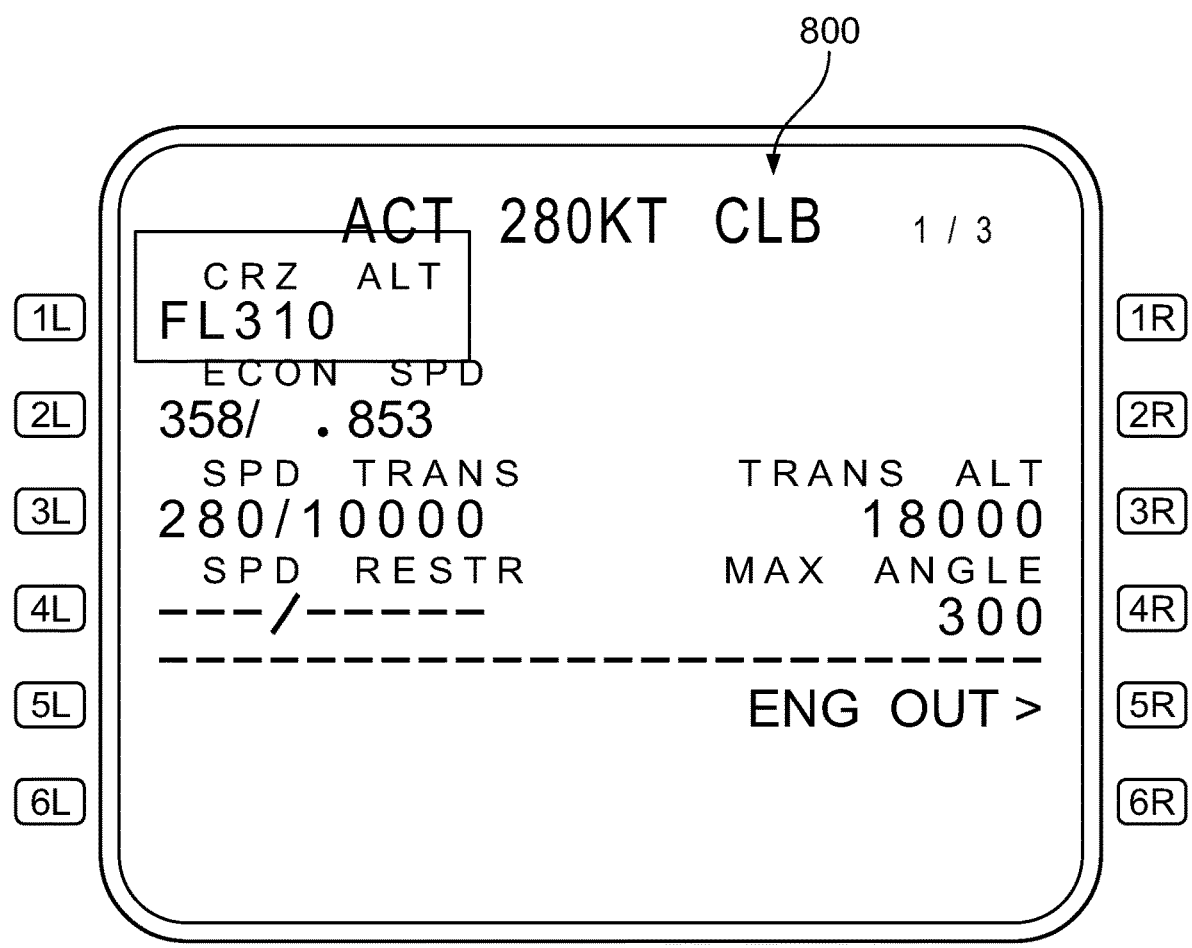

FIGS. 6-8 depicts another exemplary sequence of a PFD GUI display 600 that may be presented on a forward display device (e.g., primary display device 202) and a corresponding destination FMS page GUI displays 700, 800 that may be presented on an MCDU or other head down display device (e.g., secondary display device 204) depending on the current operational context in connection with one or more exemplary implementations of the secondary display updating process 300. In this regard, FIG. 6 depicts the location 602 of a received tactile user input 604 overlying a graphical representation 606 of the target cruise altitude above the altimeter tape. In response to receiving the coordinate location pilot's touch input via the tactile user input device 210, the display system 206 identifies the corresponding coordinate location on the PFD GUI display 222, 600 as corresponding to the cruise altitude setting and provides corresponding indication of selection of the cruise altitude setting to the display updating service at the processing system 216.

As shown in FIG. 7, when the current aircraft operational context corresponds to a preflight phase (e.g., prior to take off while the current aircraft altitude corresponds to the aircraft on the ground), in response to the cruise altitude selection, the display updating service determines the target operational context for the received input 604 as viewing, modifying or otherwise defining the cruise altitude via the performance initialization FMS page and automatically commands or instructs the FMS 208 to depict the performance initialization FMS page GUI display 700 on the MCDU, where the display updating service commands the FMS 208 to automatically paginate or scroll the performance initialization FMS page GUI display 700 such that the cruise altitude setting 702 is presented at the top of the performance initialization FMS page GUI display 700. On the other hand, when the current aircraft operational context corresponds to a takeoff flight phase, in response to the cruise altitude selection, the display updating service determines the target operational context for the received input 604 as viewing, modifying or otherwise defining the cruise altitude via the climb FMS page and automatically commands or instructs the FMS 208 to depict the climb FMS page GUI display 800 on the MCDU, where the display updating service commands the FMS 208 to automatically paginate or scroll the performance initialization FMS page GUI display 700 such that the cruise altitude setting is presented at the top of the performance initialization FMS page GUI display 700. Similarly, if the current aircraft operational context were to be the cruise flight phase, in response to the cruise altitude selection, the display updating service may automatically command or instruct the FMS 208 to depict the cruise FMS page GUI display (e.g., instead of the takeoff or climb pages). In this manner, the display updating service commands the FMS 208 to present a different FMS page GUI display that will vary depending on the current operational context for the aircraft.

It should be noted that the subject matter described herein is not limited to altitude or interactions with the altimeter tape, and may be implemented in an equivalent manner for any sort of content depicted on a PFD GUI display or other forward display. For example, a pilot touching or selecting the speed tape within the speed display area of the PFD GUI display may cause the display updating service to determine the pilot intends to modify vertical speed and commands the FMS 208 to update the MCDU to display to the takeoff reference page GUI display when the aircraft is in a preflight or ground phase. On the other hand, in other flight phases, the same touch selection of the speed tape may cause the display updating service to command the FMS 208 to update the MCDU to display a different FMS page GUI display for defining speed constraints based on a determination that the pilot more likely intends to modify a speed constraint given the current operational context.

By virtue of the subject matter described herein, a user input received via a forward GUI display on a primary or forward display device may be utilized to automatically and dynamically update a different GUI display on a different and distinct secondary or head down display device, without requiring a pilot or other user to manually interact with the secondary display device to navigate or paginate through different menus, pages or other GUI display sequences on the secondary display device. In addition to reducing pilot workload, the secondary display updating process alleviates the mental burden on the pilot to remember on what page or GUI display the desired parameter, variable, setting or other data is depicted on the secondary display device or the appropriate sequence of interactions for navigating to that page or GUI display. Furthermore, the forward GUI display is maintained decluttered by avoiding use of pop-up windows or other GUI elements that could obfuscate other content displayed on the forward GUI display. As a result, a pilot may simply touch the desired content for modification on the forward PFD GUI display to cause the MCDU or other head down display to automatically update to depict the appropriate FMS page GUI display for the current operational context of the aircraft, thereby allowing the pilot to quickly perform the desired interaction with the FMS via the head down display before reverting back to an unimpeded view of the current situation on the forward PFD GUI display.

For the sake of brevity, conventional techniques related to user interfaces, touchscreens, avionics systems, FMSs, flight planning, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of assisting operation of a vehicle, the method comprising:
   identifying a desired user action with respect to an operational parameter displayed on a first graphical user interface (GUI) display on a first display device based at least in part on current status information associated with the vehicle and a location of a user input on the first GUI display;
   analyzing a plurality of potential GUI displays for a second display device distinct from the first display device to determine a destination GUI display to receive a second user input to perform the desired user action with respect to the operational parameter, wherein the destination GUI display is different from the first GUI display on the first display device and different from a second GUI display on the second display device; and
   automatically updating the second display device to present the destination GUI display in lieu of the second GUI display responsive to the user input on the first GUI display on the first display device.

2. The method of claim 1, further comprising determining a selection context associated with the user input based at least in part on content displayed on the first GUI display at the location of the user input on the first GUI display, wherein identifying the desired user action comprises determining a target operational context associated with the user input based at least in part on the selection context and the current status information associated with the vehicle.

3. The method of claim 2, wherein:
   determining the target operational context comprises determining at least one of a parameter, a variable, a setting, a configuration or an action to be interacted with based at least in part on the selection context and the current status information associated with the vehicle; and
   analyzing the plurality of potential GUI displays to determine the destination GUI display comprises determining the destination GUI display for interacting with the least one of the parameter, the variable, the setting, the configuration or the action.

4. The method of claim 1, wherein automatically updating the second GUI display comprises automatically updating a secondary display device to present the destination GUI display in lieu of the second GUI display responsive to the user input on the first GUI display on a primary display device distinct from the secondary display device.

5. The method of claim 4, wherein the primary display device comprises a forward display device and the secondary display device comprises a head down display device.

6. The method of claim 5, wherein the head down display device comprises a multifunction control and display unit (MCDU) or a multifunction display (MFD).

7. The method of claim 1, wherein first GUI display comprises a forward-looking display and the second GUI display comprises a head down display.

8. The method of claim 7, wherein:
   the vehicle comprises an aircraft having a flight management system (FMS);
   the forward-looking display comprises a primary flight display (PFD) GUI display;
   the second GUI display comprises an initial FMS page GUI display; and
   the destination GUI display comprises an updated FMS page GUI display different from the initial FMS page GUI display.

9. The method of claim 8, wherein automatically updating the second GUI display comprises automatically providing a revision command to the FMS to display the updated FMS page GUI display in lieu of the initial FMS page GUI display.

10. The method of claim 8, wherein:
    the current status information includes a current flight phase associated with the aircraft;
    determining the operational context comprises:
       determining a selection context associated with the user input based at least in part on content displayed on the PFD GUI display at the location of the user input on the PFD GUI display; and
       determining a target operational context associated with the user input based at least in part on the selection context and the current flight phase associated with the aircraft; and
    analyzing the plurality of potential GUI displays to determine the destination GUI display comprises determining the updated FMS page GUI display for receiving the second user input corresponding to the location of the user input on the PFD GUI display based at least in part on the operational context.

11. The method of claim 10, wherein the updated FMS page GUI display varies depending on the current flight phase.

12. A non-transitory computer-readable medium having computer-executable instructions stored thereon that, when executed by a processing system, cause the processing system to:
    identifying a desired user action with respect to an operational parameter displayed on a first graphical user interface (GUI) display on a first display device based at least in part on current status information associated with a vehicle and a location of a user input on the first GUI display;
    analyze a plurality of potential GUI displays for a second display device distinct from the first display device to determine a destination GUI display to receive a second user input to perform the desired user action with respect to the operational parameter, wherein the destination GUI display is different from the first GUI display on the first display device and different from a second GUI display on the second display device; and
    automatically update the second display device to present the destination GUI display in lieu of the second GUI display responsive to the user input on the first GUI display on the first display device.

13. The computer-readable medium of claim 12, wherein the instructions are configurable to cause the processing system to determine a selection context associated with the user input based at least in part on content displayed on the first GUI display at the location of the user input on the first GUI display, wherein identifying the desired user action comprises determining a target operational context associated with the user input based at least in part on the selection context and the current status information associated with the vehicle.

14. The computer-readable medium of claim 13, wherein the instructions are configurable to cause the processing system to:
determine at least one of a parameter, a variable, a setting, a configuration or an action to be interacted with based at least in part on the selection context and the current status information associated with the vehicle; and
determine the destination GUI display for interacting with the least one of the parameter, the variable, the setting, the configuration or the action.

15. The computer-readable medium of claim 12, wherein the instructions are configurable to cause the processing system to automatically update a secondary display device to present the destination GUI display in lieu of the second GUI display responsive to the user input on the first GUI display on a primary display device distinct from the secondary display device.

16. The computer-readable medium of claim 15, wherein:
the primary display device comprises a forward display device;
the secondary display device comprises a head down display device; and
the first GUI display comprises a primary flight display (PFD) GUI display.

17. The computer-readable medium of claim 16, wherein:
the head down display device comprises a multifunction control and display unit (MCDU); and
the destination GUI display comprises a flight management system (FMS) page GUI display.

18. The computer-readable medium of claim 12, wherein the current status information includes a current flight phase associated with an aircraft and the destination GUI display is influenced by the current flight phase.

19. A vehicle system comprising:
a primary display device;
a first system coupled to the primary display device to provide a first graphical user interface (GUI) display on the primary display device;
a secondary display device distinct from the primary display device;
a second system coupled to the secondary display device to provide a second GUI display on the secondary display device; and
a processing system coupled to the first system and the second system to provide a secondary display updating service configurable to:
receive indication of a selection context associated with a location of a user input on the first GUI display from the first system on the primary display device;
determine a target operational context for a desired user action with respect to an operational parameter displayed on the first GUI display based at least in part on the selection context and current status information associated with a vehicle;
analyze a plurality of potential GUI displays for the secondary display device to determine a destination GUI display to receive a second user input to perform the desired user action with respect to the operational parameter corresponding to the target operational context; and
automatically command the second system to update the secondary display device to display the destination GUI display in lieu of the second GUI display responsive to the user input on the first GUI display on the primary display device, wherein the destination GUI display is different from the first GUI display on the primary display device and different from the second GUI display on the secondary display device.

* * * * *